United States Patent
Hu et al.

(10) Patent No.: US 10,615,585 B2
(45) Date of Patent: Apr. 7, 2020

(54) FAULT MITIGATION FOR ELECTRICAL ACTUATOR USING REGULATED VOLTAGE CONTROL

(71) Applicant: GM Global Technology Operations LLC, Detroit, MI (US)

(72) Inventors: Yao Hu, Sterling Heights, MI (US); Xinyu Du, Oakland Township, MI (US); Joshua J. Sanchez, Sterling Heights, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 15/660,099

(22) Filed: Jul. 26, 2017

(65) Prior Publication Data

US 2019/0036321 A1 Jan. 31, 2019

(51) Int. Cl.
*H02H 1/06* (2006.01)
*H02H 9/04* (2006.01)
*B60R 16/03* (2006.01)
*F02D 41/22* (2006.01)
*H02J 7/14* (2006.01)
*F02D 29/06* (2006.01)
*F02D 41/30* (2006.01)

(52) U.S. Cl.
CPC ............... *H02H 1/06* (2013.01); *B60R 16/03* (2013.01); *F02D 41/221* (2013.01); *H02H 9/045* (2013.01); *H02J 7/14* (2013.01); *H02J 7/1461* (2013.01); *F02D 29/06* (2013.01); *F02D 41/3082* (2013.01)

(58) Field of Classification Search
USPC .............................................. 361/23, 86–87
See application file for complete search history.

(56) References Cited

U.S. PATENT DOCUMENTS 8,234,045 B2 * 7/2012 Spadafora .............. B62D 5/003
340/507
8,473,147 B2 6/2013 Ghoneim
2016/0223430 A1 * 8/2016 Yasui .................. G01M 13/021

* cited by examiner

*Primary Examiner* — Danny Nguyen

(57) ABSTRACT

A method for mitigating an electrical actuator fault in a system containing multiple actuators includes: applying multiple predetermined conditions to each of multiple actuators in a vehicle system to identify when at least one of the multiple actuators is in a faulted condition; and increasing an input voltage to all of the actuators to increase an output of the at least one of the multiple actuators in the faulted condition to mitigate the faulted condition.

18 Claims, 3 Drawing Sheets

FAULT MITIGATION FOR ELECTRICAL ACTUATOR USING REGULATED VOLTAGE CONTROL

INTRODUCTION

The present disclosure relates to electrically controlled actuators used in motor vehicles.

Electrically controlled actuators are used in many systems of an automobile vehicle, including but not limited to fuel pumps, camshafts, and the like. Many known actuators operate with electrical motors controlled using a pulse width modulation voltage. Actuator function may degrade over time due to various conditions, including wear, temperature extremes including overheating, and friction. As actuators degrade, known control systems which sense a state of health (SOH) of the actuators may attempt to compensate for reduced actuator output in several ways. One such way is to increase the actuator output by increasing its input to a predetermined maximum amount, for example by increasing a fuel pump output pressure by applying a maximum pulse width modulated (PWM) duty cycle of the pump. A further way is to decrease the duty cycle of the pump by reducing or optimizing pump operation when possible to extend pump life.

When degradation occurs resulting in an actuator fault, known vehicle health management (VHM) systems do not provide fault mitigation, but generally only provide a fault signal to the vehicle operator and may generate a diagnostic code for use by a maintenance technician or for remote transmission if the vehicle is equipped with a telematics unit. This may undesirably result in a "walk home" incident, wherein an actuator ceases to function at a sufficient rate for sustaining proper operation of the engine or transmission.

Thus, while current actuator control systems achieve their intended purpose, there is a need for a new and improved actuator fault mitigation system and method for actuator control during fault conditions.

SUMMARY

According to several aspects, a method for mitigating an electrical actuator fault in a system containing multiple actuators includes: applying multiple predetermined conditions to each of multiple actuators in a vehicle system to identify when at least one of the multiple actuators is in a faulted condition; and increasing an input voltage to all of the actuators to increase an output of the at least one of the multiple actuators in the faulted condition to mitigate the faulted condition.

In another aspect of the present disclosure, the method further includes connecting each of the actuators to a vehicle generator operable over a range of output voltages, wherein the increasing step includes increasing an output voltage of the vehicle generator.

In another aspect of the present disclosure, the method further includes determining a maximum available output voltage for the vehicle generator prior to increasing the output voltage of the vehicle generator.

In another aspect of the present disclosure, the method further includes determining a safe voltage Vsafe for operating each of the multiple actuators prior to increasing the output voltage of the vehicle generator, wherein the safe voltage Vsafe is less than the maximum available output voltage.

In another aspect of the present disclosure, the method further includes limiting the input voltage to each of the actuators to the safe voltage Vsafe.

In another aspect of the present disclosure, the method further includes determining a safe voltage Vsafe for operating each of the multiple actuators prior to increasing the output voltage of the vehicle generator, wherein the safe voltage Vsafe is less than or equal to the maximum available output voltage.

In another aspect of the present disclosure, the method further includes prior to the increasing step calculating multiple correction factors.

In another aspect of the present disclosure, the method further includes prior to the increasing step applying a weighting factor to each of the multiple correction factors.

In another aspect of the present disclosure, the method further includes prior to the increasing step calculating an overall correction factor Cf equaling a sum of the multiple correction factors including the weighting factors plus 1.

In another aspect of the present disclosure, the method further includes prior to the increasing step calculating an adjusted voltage Vadj idefined as a minimum of [the maximum available output voltage of the generator, the safe voltage Vsafe and a product of the overall correction factor Cf and a present output voltage from the generator]; and during the increasing step applying the adjusted voltage Vadj as the input voltage.

According to several aspects, a method for mitigating an electrical actuator fault in a system containing multiple actuators, comprising: for each of multiple actuators in a vehicle system calculating an actuator output error $\mu_{output\_err}$ wherein the actuator output error $\mu_{output\_err}$ is equivalent to a mean of [an actuator desired output minus an actual output of the actuator], a PWM duty cycle $\mu_{pwm}$, and an adjusted PWM duty cycle to define when a faulted condition of at least one of the actuators is present; and increasing an input voltage to all of the actuators to increase an output of the at least one of the multiple actuators in the faulted condition to mitigate the faulted condition.

In another aspect of the present disclosure, the method further includes calculating multiple conditions including a Condition$_1$, a Condition$_2$, a Condition$_3$, a Condition$_4$, and a Condition$_5$; and determining if Condition$_1$ is true AND if any one or more of Condition$_2$ OR Condition$_3$ OR Condition$_4$ OR Condition$_5$ is also true.

In another aspect of the present disclosure, Condition$_1$ defines ($\mu_{output\_err}$ greater than a first threshold) AND ($\mu_{pwm}$ greater than a second threshold) AND a fault diagnostics isolation result output defines a projected actuator failure for at least one of the multiple actuators.

In another aspect of the present disclosure, Condition$_2$ defines a state of health of the actuator less than a third threshold; Condition$_3$ defines a long term correction factor of the actuator greater than a fourth threshold; Condition$_4$ defines an adjusted PWM of the actuator greater than a fifth threshold; and Condition$_5$ defines an estimated resistance of the actuator greater than a sixth threshold.

In another aspect of the present disclosure, the PWM duty cycle $\mu_{pwm}$ of the at least one of the multiple actuators in the faulted condition defines a mean PWM duty cycle [$\mu_{pwm}$=mean (PWM)].

In another aspect of the present disclosure, the adjusted PWM duty cycle is calculated by multiplying a quotient of a generator voltage divided by a desired output of each of the actuators by a PWM duty cycle.

In another aspect of the present disclosure, the method further includes prior to the increasing step: calculating multiple correction factors including: a first correction factor $cf_1 = a_1 \cdot$ maximum of $\{0$, or $\mu_{output\_err}$ – a first threshold$\}$; a second correction factor $cf_2 = a_2 \cdot$ maximum of $\{0$, or $\mu_{pwm}$ – a second threshold$\}$; a third correction factor $cf_3 = a_3 \cdot$ maximum of $\{0$, or the third threshold minus a state of health of the actuator$\}$; a fourth correction factor $cf_4 = a_4 \cdot$ maximum of $\{0$, or a long term correction factor minus a fourth threshold$\}$; a fifth correction factor $cf_5 = a_5 \cdot$ maximum of $\{0$, or Adjusted PWM minus a fifth threshold$\}$; and a sixth correction factor $cf_6 = a_6 \cdot$ maximum of $\{0$, or an estimated actuator resistance minus a sixth threshold$\}$; wherein $a_1$, $a_2$, $a_3$, $a_4$, $a_5$, as each define a scaling factor; calculating an overall correction factor Cf using an equation $Cf = 1 + [w_1, w_2, w_3, w_4, w_5, w_6][cf_1 + cf_2 + cf_3 + cf_4 + cf_5 + cf_6]$ wherein $w_1$, $w_2$, $w_3$, $w_4$, $w_5$, $w_6$ each define a weighting factor; and determining the input voltage to apply as an adjusted voltage equal to [Cf multiplied by a present voltage applied to the actuators].

According to several aspects, a method for mitigating an electrical actuator fault in a system containing multiple actuators, includes: calculating an actuator output error $\mu_{output\_err}$, a PWM duty cycle $\mu_{pwm}$, and an adjusted PWM duty cycle for each of the multiple actuators in the system; evaluating multiple conditions for each of the actuators including a Condition$_1$, a Condition$_2$, a Condition$_3$, a Condition$_4$, and a Condition$_5$, wherein a faulted condition of at least one of the actuators is defined when Condition$_1$ is true and at least one of Condition$_2$, or Condition$_3$, or Condition$_4$, or Condition$_5$ is true; determining a safe voltage Vsafe for operating each of the multiple actuators connected to a vehicle generator, when the safe voltage Vsafe is less than or equal to a maximum available output voltage of a vehicle generator; and increasing an output voltage of the vehicle generator to the safe voltage Vsafe thereby increasing an output of the at least one of the multiple actuators in the faulted condition to mitigate the faulted condition.

In another aspect of the present disclosure, the method further includes identifying an overall correction factor; determining a product of the overall correction factor and a voltage presently applied to the actuators; and changing the output voltage to the product prior to the increasing step if the product is less than the safe voltage Vsafe.

In another aspect of the present disclosure, the method further includes limiting the output voltage to the maximum available voltage of the vehicle generator if the safe voltage Vsafe and the product are each greater than the maximum available voltage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
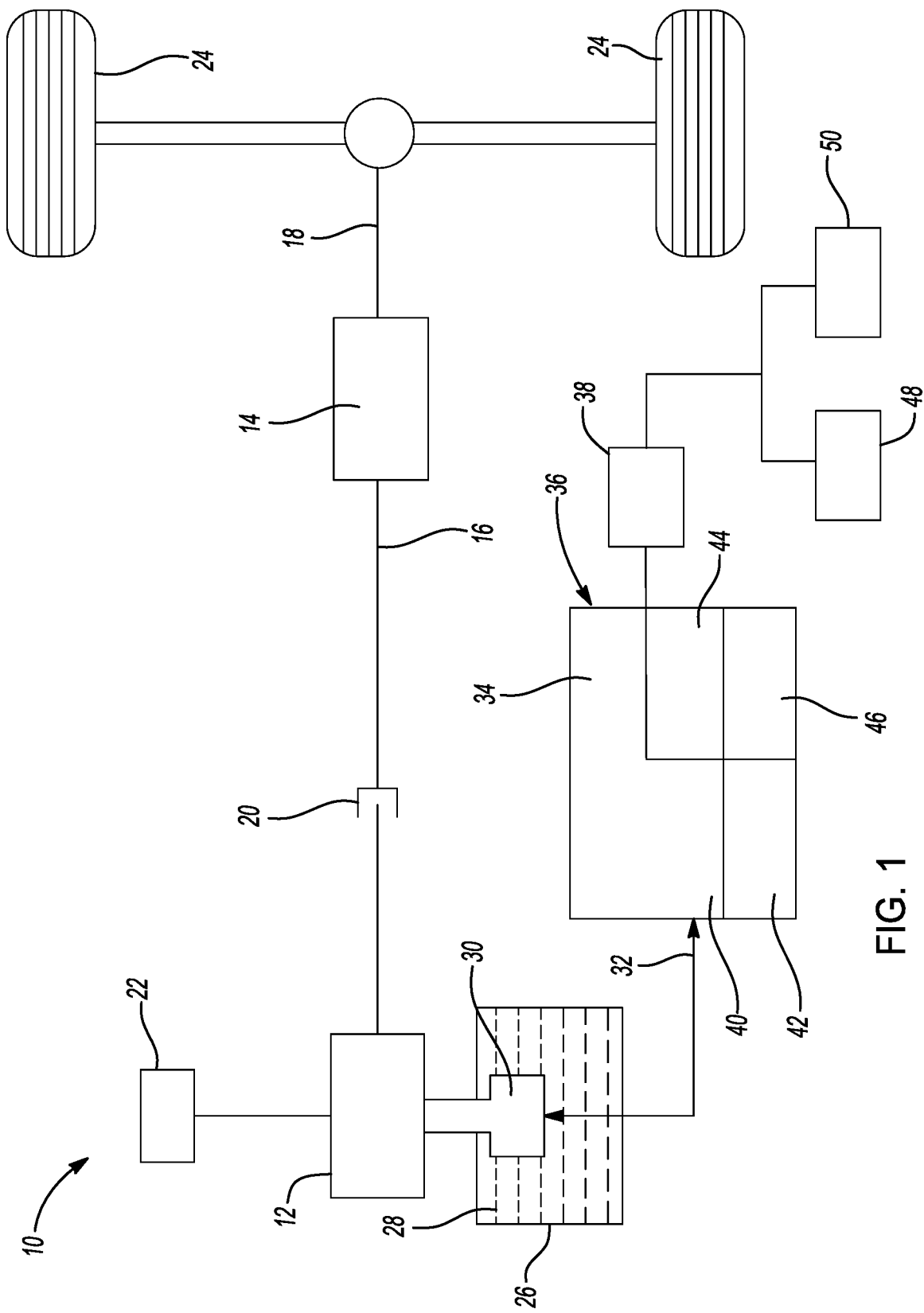
FIG. 1 is a schematic illustration of a vehicle system having fault mitigation for electrical actuators using regulated voltage control according to an exemplary embodiment.

Referring to the Figures in general, wherein like reference numbers correspond to like or similar components throughout the several figures, and referring specifically to FIG. 1, a vehicle 10 includes an internal combustion engine 12 providing motive force to a transmission 14 having an input member 16 and an output member 18. The engine 12 may be selectively connected to the transmission 14 using an input clutch and damper assembly 20. The vehicle 10 may also include a DC energy storage system 22, e.g., a rechargeable battery, which may be electrically connected to provide starting current to the engine 12, or to provide power if the vehicle 10 is a hybrid electric vehicle (HEV). Output torque from the transmission 14 is ultimately transferred via the output member 18 to a set of driven wheels 24 to propel the vehicle 10.

Vehicle 10 further includes a fuel tank 26 containing a supply of fuel 28 such as gasoline, ethanol, E85, or other combustible fuel sealed relative to the surrounding environment. Vehicle 10 also includes multiple actuators, which according to one aspect include a fuel pump 30 such as a roller cell pump or a gerotor pump which may be submerged in the fuel 28 within the fuel tank 26, and is operable for circulating the fuel 28 to the internal combustion engine 12 in response to control and feedback signals (arrow 32) from a controller 34. For simplicity, fuel rails and injectors of the engine 12 and actuators which for exemplary control functions of one or more engine camshafts, which define further actuators of the vehicle 10 are omitted from FIG. 1.

Vehicle 10 further includes a control system 36 in communication with a generator 38 which can provide a variable voltage. The control system 36 is also in communication with multiple actuators 40, 42, 44, 46 in addition to the exemplary electrical fuel pump 30. The controller 34 is configured for providing operational control signals to the various actuators, determining a state of health (SOH) term for each of the various actuators including the fuel pump 30 in the control system 36, and for determining if a fault condition of one or more of the actuators is present. Following the determination that a fault condition is present, the controller 34 is further configured for calculating an upper bound of a safe generator voltage Vsafe 48, and for calculating an increased generator voltage Vincr 50 that can be safely applied to all of the actuators, including the fuel pump 30, to maximize an operating output of the actuator presently operating in a fault condition to mitigate the fault condition.

Figure 2:
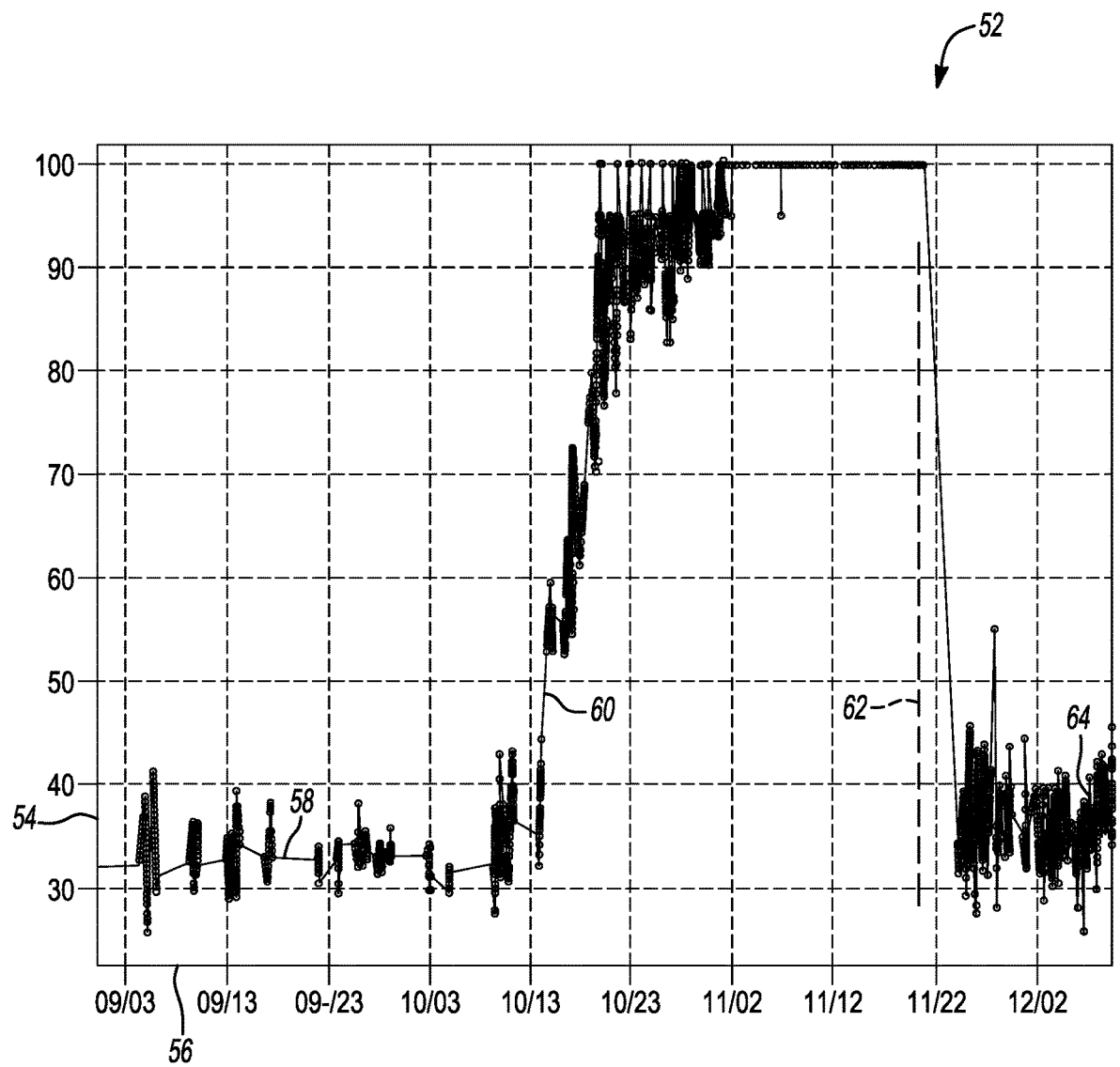
FIG. 2 is a graph of an exemplary actuator pump operation during normal and faulted conditions.

Referring to FIG. 2 and again to FIG. 1, an exemplary fault condition for one of the actuators is presented in relation to the fuel pump 30. FIG. 2 presents a graph 52 including a fuel pump power module output PWM duty cycle 54 expressed as a percentage of the PWM duty cycle over a time line 56. As known, PWM defines a pulse width modulated voltage or signal and a PWM duty cycle defines the control signal for most commonly used actuators. In a first curve portion 58, a normally operating fuel pump duty cycle ranges between approximately 25% up to 43%. Beginning at an exemplary date of approximately October 13, a second curve portion 60 for the fuel pump 30 presents a degrading and therefore a faulted condition for the fuel pump power module output PWM duty cycle which reaches a maximum duty cycle of 100% at approximately October 19. The fuel pump 30 is repaired on or about November 21, as indicated by a vertical line 62, therefore as shown in a third curve portion 64 for the fuel pump 30 the fuel pump power module output PWM duty cycle returns to a normal operation ranging between approximately 25% up to 45%.

The PWM duty cycle can normally be determined using the following proportionality equation:

$$PWM \propto \frac{\text{Desired Output}}{\text{Generator Voltage} \times \text{Actuator } SOH} \times [1 + a(\text{Desired Output} - \text{Actual Output})]$$

Using for the present example the fuel pump 30 as one of the multiple system actuators, as degradation of the actuator or pump occurs, in order to continue to meet the demanded output from the fuel pump 30, feed-back control from the fuel pump 30 is applied to determine a higher PWM duty cycle in order to satisfy pump demand, however, pump operation is limited to the maximum 100% PWM duty cycle using 100% of the available power. In an exemplary aspect of the present disclosure, using the second curve portion 60 it is desirable to identify when a fuel pump power module output PWM duty cycle percentage indicates the faulted condition of the fuel pump 30 has been reached. This may be at a predetermined PWM duty cycle percentage such as at 50% when the PWM duty cycle has exceeded its normal high value of approximately 45%. Once the faulted condition has been reached, an algorithm of the present disclosure calculates corrective mitigating action to permit the fuel pump 30 to continue to achieve as close to its maximum output pressure as possible.

Figure 3:
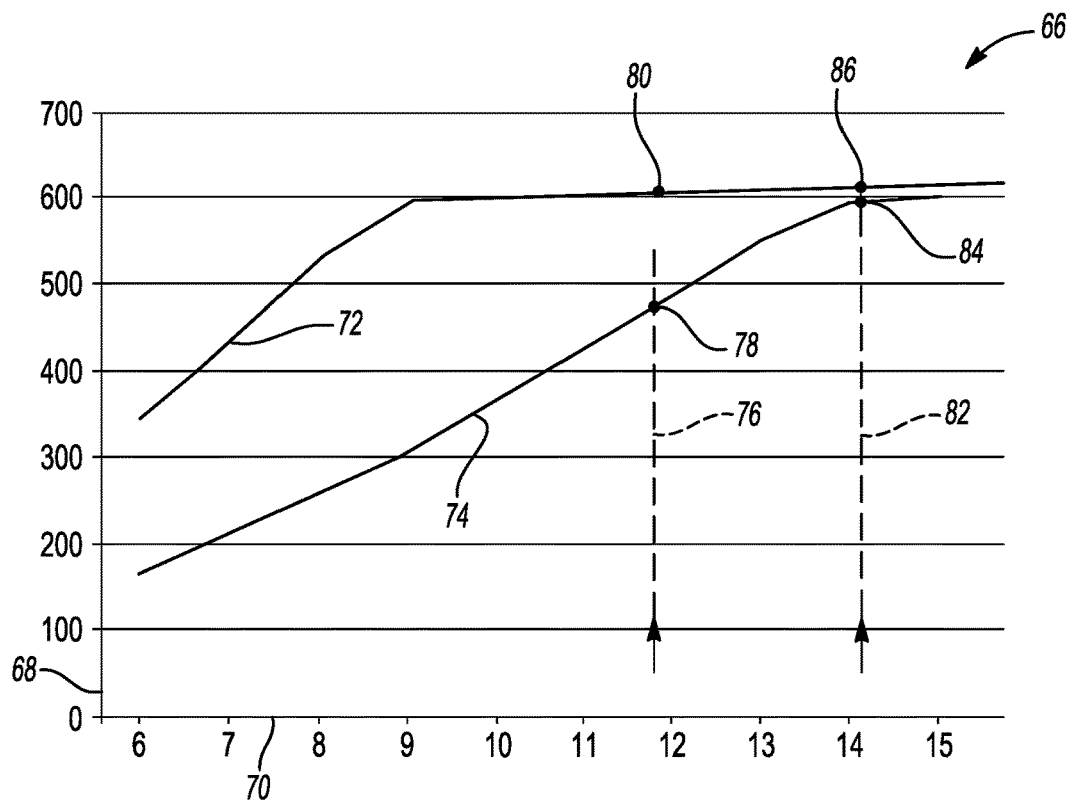
FIG. 3 is a graph comparing output from each of a faulted pump and a normally functioning pump at varying input voltage levels.

Referring to FIG. 3 and again to FIG. 2, a graph 66 presents operational curves comparing a pump output pressure 68 versus an input voltage multiplied by the PWM duty cycle 70 applied to the fuel pump 30 for each of a new or nominal operational pump curve 72 and a degraded pump curve 74. It is evident that at lower input voltage, for example at an input voltage 76 normally applied to obtain maximum vehicle fuel economy, a pump output pressure 78 of the degraded pump curve 74 is more than 100 kpa below a maximum pump output pressure 80 of the nominal operational pump curve 72.

When the input voltage is increased, for example to an input voltage 82, a pump output pressure 84 of the degraded pump curve 74 is increased and is substantially equal to a pump output pressure 86 of the nominal operational pump curve 72. It is evident from FIG. 3 that increasing the input voltage of a degrading or faulted pump, or other actuator, can at least temporarily increase an output of a degrading or faulted pump or actuator up to an output of a nominally operating actuator. It is also true however that increasing the output voltage of the generator 38 will equally increase the input voltage to all of the actuators of the vehicle 10. It is therefore necessary prior to inducing a global voltage increase to identify a safe input voltage for each of the actuators due to the varied operational parameters, heat loading, and the like of each actuator.

Figure 4:
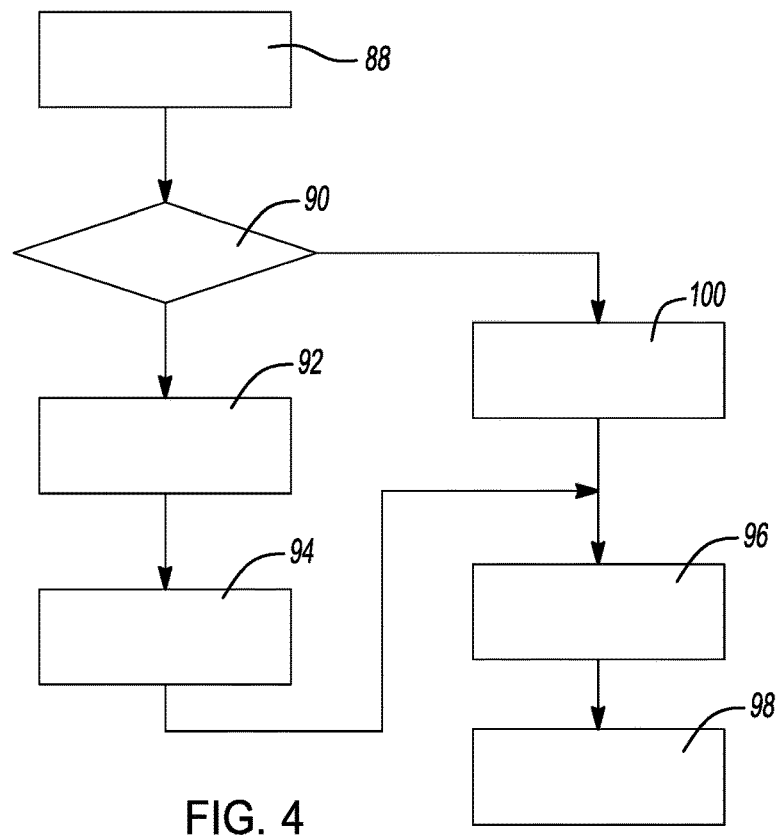
FIG. 4 is a flow diagram describing a method for determining an adjusted input voltage to provide fault mitigation for electrical actuators using regulated voltage control for the system of FIG. 1.

Referring to FIG. 4, multiple process steps are provided which identify the safe generator voltage Vsafe 48 that can be applied to all of the system actuators if any one or more of the system actuators is operating in a fault condition. The applied safe generator voltage Vsafe 48 will then act to increase the output of all of the actuators, including the faulted actuator, thereby mitigating the fault condition without inducing a walk home scenario for the vehicle 10.

In a first step 88, multiple actuator values are calculated to identify if an actuator is defined as being in a faulted condition. In a first calculated actuator value an actuator output error $\mu_{output\_err}$ is equivalent to the mean of an actuator desired output (such as a new pump output pressure) minus an actual output (such as an existing pump output pressure) of the actuator [$\mu_{output\_err}$=mean (Desired Output−Actual Output)]. In a second calculated value a PWM duty cycle of the actuator $\mu_{pwm}$ is determined as a mean PWM duty cycle [$\mu_{pwm}$=mean (PWM)]. A normalized or adjusted PWM duty cycle is calculated to identify a level of degradation by applying a constant $k_1$ using the equation:

$$\text{Adjusted } PWM = k_1 \frac{\text{Generator Voltage}}{\text{Desired Output}} \cdot PWM$$

where the generator voltage is a measured output voltage of the vehicle generator, the desired output defines an actuator output using a new or nominal actuator, and adjusted PWM defines a mean pulse width modulation duty cycle of the actuator.

In a second step 90, based on the above calculations, the following five predetermined conditions are applied as defined below to identify a state of health of each of the system actuators, to thereby identify if any of the actuators is degraded or faulted:

Condition$_1$: ($\mu_{output\_err}$>Thrd$_1$) AND ($\mu_{pwm}$>Thrd$_2$) AND (fault diagnostics/isolation results=actuator failure);

Condition$_2$: SOH<Thrd$_3$ where SOH defines a state of health term of the suspected faulted actuator;

Condition$_3$: LTCF>Thrd$_4$ where LTCF defines a long term correction factor;

Condition$_4$: Adjusted PWM>Thrd$_5$ based on the adjusted PWM calculated above;

Condition$_5$: Estimated Resistance>Thrd$_6$, where the estimated resistance defines a measured or estimated internal resistance of the suspected faulted actuator.

In the above conditions Thrd$_1$, Thrd$_2$, Thrd$_3$, Thrd$_4$, and Thrd$_5$ are predetermined thresholds which may vary between individual vehicle designs or between individual vehicles based on initial performance testing. The term fault diagnostics/isolation results=actuator failure in above Condition$_1$ is a diagnostic signal created using system fault diagnostics generated when one of the multiple actuators is predicted to fail. In the second step 90 applying the above conditions, any one of the multiple vehicle actuators is defined as being in a faulted condition if Condition$_1$ is true AND if any one or more of Condition$_2$ OR Condition$_3$ OR Condition$_4$ OR Condition$_5$ is also true for that actuator. If any input associated with Condition$_2$, Condition$_3$, Condition$_4$ or Condition$_5$ is not available, then that condition is ignored.

In a third step 92, if the output from the second step 90 is YES, wherein Condition$_1$ is true AND if any one or more of Condition$_2$ OR Condition$_3$ OR Condition$_4$ OR Condition$_5$ is also true, the actuator is considered faulted and up to six independent correction factors are then determined to weight the effect of each of the condition terms. The correction factors are determined as follows:

$cf_1 = a_1 \cdot$ maximum of $\{0,$ or $\mu_{output\_err} - Thrd_1\}$ $cf_2 = a_2 \cdot$ maximum of $\{0,$ or $\mu_{pwm} - Thrd_2\}$ $cf_3 = a_3 \cdot$ maximum of $\{0,$ or $Thrd_3 - SOH\}$ $cf_4 = a_4 \cdot$ maximum of $\{0,$ or $LTCF - Thrd_4\}$ $cf_5 = a_5 \cdot$ maximum of $\{0,$ or Adjusted $PWM - Thrd_5\}$ $cf_6 = a_6 \cdot$ maximum of $\{0,$ or Estimated Resistance $- Thrd_6\}$ By applying a maximum of either zero or the following term in the above correction factors, the correction factor will always be either zero or have a positive value. If any input associated with cf1, cf2, cf3, cf4, cf5, cf6, is not available, then that correction factor is ignored.

In determining the above correction factors, the terms are not equivalent. For example the PWM duty cycle ranges from zero to 100, while the mean output pressure from an actuator in kpA may range in the hundreds. For this reason, the overall correction factor Cf can also be adjusted to normalize a scale of the individual correction factor terms using a scaling factor. Predetermined scaling factors $a_1$, $a_2$, $a_3$, $a_4$, $a_5$, $a_6$ may therefore be applied to any or all of the correction factors.

In a fourth step 94, an overall correction factor Cf is determined using the following equation:

$$Cf = 1 + [w_1, w_2, w_3, w_4, w_5, w_6][cf_1 + cf_2 + cf_3 + cf_4 + cf_5 + cf_6]^T$$

where $w_1$, $w_2$, $w_3$, $w_4$, $w_5$, $w_6$ each define a weighting factor which can be assigned to each correction factor based on its importance. For example, if an actuator does not include the LTCF term its weighting factor $w_4$ would equal zero thereby nullifying the correction factor $cf_4$. The weighting factors will be retained for each calculation, but may vary between different vehicle models and may vary from one vehicle to another for the same vehicle model. The weighting factors may be determined during an initial calibration of the vehicle, and may vary if one of the calibration factors is deemed to have greater importance than another.

In a fifth step 96, when it is desirable to increase the generator output voltage to mitigate a faulted actuator, an upper bound of the safe generator voltage Vsafe 48 incorporating safety criteria is first determined based on the status of each of the actuators. Vsafe 48 defines a maximum generator output voltage above a measured present or original generator output voltage that can be set which is safe to apply to of each of the system actuators, not just to the faulted actuator. For example, if one of the actuators has a high resistance fault it can tolerate a lower input voltage due to actuator overheat concerns, and the converse is true.

In a sixth step 98, an adjusted generator voltage Vadj is then calculated using the following equation:

$$Vadj = \text{minimum of } \{V_{max}, \text{ OR } V_{safe}, \text{ OR } Cf \cdot V_{original}\}$$

where $V_{max}$ defines a maximum achievable output voltage of the generator saved in a memory, $V_{safe}$ 48 is calculated as noted above in the fifth step 96, and $Cf \cdot V_{original}$ is the original or presently applied generator output voltage multiplied by the overall correction factor Cf calculated in the fourth step 94 above. A control signal is then sent to the generator 38 to increase an output voltage of the generator 38 up to the adjusted generator voltage Vadj.

In a seventh step 100, if the output from the second step 90 is NO, wherein either Condition$_1$ is false OR if Condition$_1$ is true but each of Condition$_2$ AND Condition$_3$ AND Condition$_4$ AND Condition$_5$ is false the overall correction factor Cf from the above equation $Cf = 1 + [w_1, w_2, w_3, w_4, w_5, w_6][cf_1 + cf_2 + cf_3 + cf_4 + cf_5 + cf_6]^T$ is equal to one. The $Cf \cdot V_{original}$ term therefore controls and the original or presently applied voltage $V_{original}$ will be retained.

A system and method for mitigating an electrical actuator fault in a system containing multiple actuators of the present disclosure offers several advantages. These include means to identify when an actuator has reached a faulted condition, and a process to identify a voltage increase that the vehicle generator can output that is safe to apply to all of the system actuators that simultaneously increases an output of the faulted actuator. This permits near normal continued operation of the vehicle until corrective action can be taken for the faulted actuator.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for mitigating an electrical actuator fault in a system containing multiple actuators, comprising:
   applying multiple predetermined conditions to each of multiple actuators in a vehicle system to identify when at least one of the multiple actuators is in a faulted condition;
   increasing an input voltage to all of the actuators to increase an output of the at least one of the multiple actuators in the faulted condition to mitigate the faulted condition,
   connecting each of the actuators to a vehicle generator operable over a range of output voltages, wherein the increasing step includes increasing an output voltage of the vehicle generator; and
   determining a maximum available output voltage for the vehicle generator prior to increasing the output voltage of the vehicle generator.

2. The method for mitigating an electrical actuator fault in a system containing multiple actuators of claim 1, further including determining a safe voltage Vsafe for operating each of the multiple actuators prior to increasing the output voltage of the vehicle generator, wherein the safe voltage Vsafe is less than the maximum available output voltage.

3. The method for mitigating an electrical actuator fault in a system containing multiple actuators of claim 2, further including limiting the input voltage to each of the actuators to the safe voltage Vsafe.

4. The method for mitigating an electrical actuator fault in a system containing multiple actuators of claim 1, further including determining a safe voltage Vsafe for operating each of the multiple actuators prior to increasing the output voltage of the vehicle generator, wherein the safe voltage Vsafe is less than or equal to the maximum available output voltage.

5. The method for mitigating an electrical actuator fault in a system containing multiple actuators of claim 2, further including prior to the increasing step calculating multiple correction factors.

6. The method for mitigating an electrical actuator fault in a system containing multiple actuators of claim 5, further including prior to the increasing step applying a weighting factor to each of the multiple correction factors.

7. The method for mitigating an electrical actuator fault in a system containing multiple actuators of claim 6, further including prior to the increasing step calculating an overall correction factor Cf equaling a sum of the multiple correction factors including the weighting factors plus 1.

8. The method for mitigating an electrical actuator fault in a system containing multiple actuators of claim 5, further including:
prior to the increasing step calculating an adjusted voltage Vadj defined as a minimum of the maximum available output voltage of the generator, the safe voltage Vsafe and a product of the overall correction factor Cf and a present output voltage from the generator; and
during the increasing step applying the adjusted voltage Vadj as the input voltage.

9. A method for mitigating an electrical actuator fault in a system containing multiple actuators, comprising:
for each of multiple actuators in a vehicle system calculating an actuator output error $\mu_{output\_err}$ wherein the actuator output error $\mu_{output\_err}$ is equivalent to a mean of an actuator desired output minus an actual output of the actuator, a PWM duty cycle $\mu_{pwm}$, and an adjusted PWM duty cycle to define when a faulted condition of at least one of the actuators is present; and
increasing an input voltage to all of the actuators to increase an output of the at least one of the multiple actuators in the faulted condition to mitigate the faulted condition.

10. The method for mitigating an electrical actuator fault in a system containing multiple actuators of claim 9, further including:
calculating multiple conditions including a Condition$_1$, a Condition$_2$, a Condition$_3$, a Condition$_4$, and a Condition$_5$; and
determining if Condition$_1$ is true AND if any one or more of Condition$_2$ OR Condition$_3$ OR Condition$_4$ OR Condition$_5$ is also true.

11. The method for mitigating an electrical actuator fault in a system containing multiple actuators of claim 10, wherein Condition$_1$ defines ($\mu_{output\_err}$ greater than a first threshold) AND ($\mu_{pwm}$ greater than a second threshold) AND a fault diagnostics isolation result output defines a projected actuator failure for at least one of the multiple actuators.

12. The method for mitigating an electrical actuator fault in a system containing multiple actuators of claim 11, wherein:
Condition$_2$ defines a state of health of the actuator less than a third threshold;
Condition$_3$ defines a long term correction factor of the actuator greater than a fourth threshold;
Condition$_4$ defines an adjusted PWM of the actuator greater than a fifth threshold; and
Condition$_5$ defines an estimated resistance of the actuator greater than a sixth threshold.

13. The method for mitigating an electrical actuator fault in a system containing multiple actuators of claim 9, wherein the PWM duty cycle $\mu_{pwm}$ of the at least one of the multiple actuators in the faulted condition defines a mean PWM duty cycle $\mu_{pwm}$=mean (PWM).

14. The method for mitigating an electrical actuator fault in a system containing multiple actuators of claim 9, wherein the adjusted PWM duty cycle is calculated by multiplying a quotient of a generator voltage divided by a desired output of each of the actuators by a PWM duty cycle.

15. The method for mitigating an electrical actuator fault in a system containing multiple actuators of claim 9, further including prior to the increasing step:
calculating multiple correction factors including:
a first correction factor cf$_1$=a$_1$·maximum of {0, or $\mu_{output\_err}$−a first threshold}
a second correction factor cf$_2$=a$_2$·maximum of {0, or $\mu_{pwm}$−a second threshold}
a third correction factor cf$_3$=a$_3$·maximum of {0, or the third threshold minus a state of health of the actuator}
a fourth correction factor cf$_4$=a$_4$·maximum of {0, or a long term correction factor minus a fourth threshold}
a fifth correction factor cf$_5$=a$_5$·maximum of {0, or Adjusted PWM minus a fifth threshold}; and
a sixth correction factor cf$_6$=a$_6$·maximum of {0, or an estimated actuator resistance minus a sixth threshold};
wherein a$_1$, a$_2$, a$_3$, a$_4$, a$_5$, a$_6$ each define a scaling factor;
calculating an overall correction factor Cf using an equation Cf=1+[w$_1$, w$_2$, w$_3$, w$_4$, w$_5$, w$_6$][cf$_1$+cf$_2$+cf$_3$+cf$_4$+cf$_5$+cf$_6$] wherein w$_1$, w$_2$, w$_3$, w$_4$, w$_5$, w$_6$ each define a weighting factor; and
determining the input voltage to apply as an adjusted voltage equal to Cf multiplied by a present voltage applied to the actuators.

16. A method for mitigating an electrical actuator fault in a system containing multiple actuators, comprising:
calculating an actuator output error $\mu_{output\_err}$, a PWM duty cycle $\mu_{pwm}$, and an adjusted PWM duty cycle for each of the multiple actuators in the system;
evaluating multiple conditions for each of the actuators including a Condition$_1$, a Condition$_2$, a Condition$_3$, a Condition$_4$, and a Condition$_5$, wherein a faulted condition of at least one of the actuators is defined when Condition$_1$ is true and at least one of Condition$_2$, or Condition$_3$, or Condition$_4$, or Condition$_5$ is true;
determining a safe voltage Vsafe for operating each of the multiple actuators connected to a vehicle generator, when the safe voltage Vsafe is less than or equal to a maximum available output voltage of a vehicle generator; and
increasing an output voltage of the vehicle generator to the safe voltage Vsafe thereby increasing an output of the at least one of the multiple actuators in the faulted condition to mitigate the faulted condition.

17. The method for mitigating an electrical actuator fault in a system containing multiple actuators of claim 16, further including:
identifying an overall correction factor;
determining a product of the overall correction factor and a voltage presently applied to the actuators; and
changing the output voltage to the product prior to the increasing step if the product is less than the safe voltage Vsafe.

18. The method for mitigating an electrical actuator fault in a system containing multiple actuators of claim 17, further including limiting the output voltage to the maximum available voltage of the vehicle generator if the safe voltage Vsafe and the product are each greater than the maximum available voltage.

* * * * *